(12) United States Patent
Oota

(10) Patent No.: US 8,699,809 B2
(45) Date of Patent: Apr. 15, 2014

(54) IMAGE PROCESSING APPARATUS, IMAGE CONVERSION METHOD, AND RECORDING MEDIUM

(75) Inventor: Yuko Oota, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 874 days.

(21) Appl. No.: 12/369,174

(22) Filed: Feb. 11, 2009

(65) Prior Publication Data

US 2009/0297030 A1    Dec. 3, 2009

(30) Foreign Application Priority Data

Jun. 3, 2008   (JP) ................................ 2008-145922

(51) Int. Cl.
*G06K 9/48* (2006.01)
*G06K 9/00* (2006.01)
*G06T 11/20* (2006.01)
*G06T 9/20* (2006.01)

(52) U.S. Cl.
CPC ... *G06T 9/20* (2013.01); *G06K 9/00* (2013.01); *G06K 9/00416* (2013.01); *G06K 2209/01* (2013.01)
USPC ........... 382/242; 382/181; 382/185; 382/186; 382/197; 382/200; 382/203; 382/232; 382/243; 345/442; 345/467; 345/468

(58) Field of Classification Search
CPC ........ G06T 9/20; G06K 9/00; G06K 9/00416; G06K 2209/01
USPC ......... 382/242, 181, 185, 186, 197, 203, 232, 382/243, 200; 345/467, 468, 442, 444
See application file for complete search history.

(56) References Cited

U.S. PATENT DOCUMENTS 4,298,945 A * 11/1981 Kyte et al. ...................... 345/469
4,511,893 A *  4/1985 Fukuda ........................... 345/467
(Continued)

FOREIGN PATENT DOCUMENTS

JP   02-064877    3/1990
JP   05-290159   11/1993
(Continued)

OTHER PUBLICATIONS

Ahmad, Athar Luqman. Approximation of a Bezier Curve with a Minimal Number of Line Segments. MA thesis. University of South Alabama, 2001. Print.*

(Continued)

*Primary Examiner* — Michael A Newman
(74) *Attorney, Agent, or Firm* — Buchanan Ingersoll & Rooney PC

(57) ABSTRACT

A labeling unit that extracts a character included in raster format image data and finds the size of the extracted character, and an approximation method determination unit that determines whether or not to use curve approximation to convert the character based on the found size, are provided. In the case where it has been determined to use curve approximation, the character is converted into a vector format by performing straight-line approximation or curve approximation on each of the various parts of the contour of the character, whereas in the case where it has been determined not to use curve approximation, the character is converted into a vector format by performing straight-line approximation and not performing curve approximation on each of the various parts of the contour of the character.

13 Claims, 17 Drawing Sheets

(56) References Cited

U.S. PATENT DOCUMENTS

| | | | |
|---|---|---|---|
| 4,566,128 A * | 1/1986 | Araki | 382/242 |
| 4,700,402 A * | 10/1987 | Okai et al. | 382/242 |
| 4,853,885 A * | 8/1989 | Naoi et al. | 708/270 |
| 4,949,281 A * | 8/1990 | Hillenbrand et al. | 345/442 |
| 5,214,754 A * | 5/1993 | Okamoto et al. | 345/442 |
| 5,430,834 A * | 7/1995 | Takahashi et al. | 345/442 |
| 6,055,337 A * | 4/2000 | Kim | 382/242 |
| 6,614,940 B2 * | 9/2003 | Azam et al. | 382/242 |
| 6,633,680 B2 * | 10/2003 | Soskov et al. | 382/242 |
| 7,262,774 B2 * | 8/2007 | Iwata et al. | 345/467 |
| 7,317,543 B2 * | 1/2008 | Gnutzmann | 358/1.11 |
| 7,676,104 B2 * | 3/2010 | Terazono et al. | 382/242 |
| 2005/0008250 A1 * | 1/2005 | Lim et al. | 382/266 |
| 2005/0238244 A1 * | 10/2005 | Uzawa | 382/242 |
| 2007/0206867 A1 * | 9/2007 | Tamura et al. | 382/232 |
| 2007/0229506 A1 * | 10/2007 | Sugita et al. | 345/441 |
| 2007/0262992 A1 * | 11/2007 | Ito | 345/467 |

FOREIGN PATENT DOCUMENTS

| | | |
|---|---|---|
| JP | 07-192139 | 7/1995 |
| JP | 2005-346137 | 12/2005 |
| JP | 2007-129557 A | 5/2007 |

OTHER PUBLICATIONS

"Font Utilities—Limn (Internet Archive)." GNU Documentation. University of Utah Department of Mathematics, Sep. 3, 1999. Web. Jun. 24, 2013. <http://web.archive.org/web/19990903183958/http://www.math.utah.edu/docs/info/fontu_10.html>.*

Notification of Reason(s) for Refusal issued in the corresponding Japanese Patent Application No. 2008-145922 dated Apr. 27, 2010, and an English Translation thereof.

* cited by examiner

{ ■ : BLACK PIXEL
  □ : WHITE PIXEL }

FIG. 12A

KMD q,···9,38,S,24,38,S,24,31,S,9,28,S,9,21,S,14,21,S,16,26,S,24,26,S,24,16,S,2,16, S,0,12,S,4,9,S,7,14,S,24,14,S,24,4,S,19,4,S,19,0,S,31,2,S,28,12,S,45,9,S,45,14, S,40,16,S,31,16,S,45,26,S,43,28,S,28,28,S,28,38,S,33,40,S,43,40,S,48,48,S,45, 50,S,28,45,S,28,50,S,21,52,S,12,52,S,4,43,S,x,x,Q

FIG. 12B

KMD q,···0,45,S,0,42,S,0,403,34,7,28,C,14,19,S,2,21,S,0,16,S,12,16,S,12,10,S,<u>12,7, 11,3,9,2,C</u>,7,0,S,19,0,S,19,16,S,21,16,S,24,12,S,43,9,S,40,40,S,44,40,S,<u>46,40, 49,38,51,36,C</u>,55,31,S,55,34,S,<u>55,36,54,40,52,42,C</u>,50,45,S,36,45,S,36,14,S28, 18,S,<u>24,19,21,22,20,22,C,19,23,19,28,19,36,C,19,43,18,48,18,49,C</u>,16,50,S,9, 43,S,x,x,Q

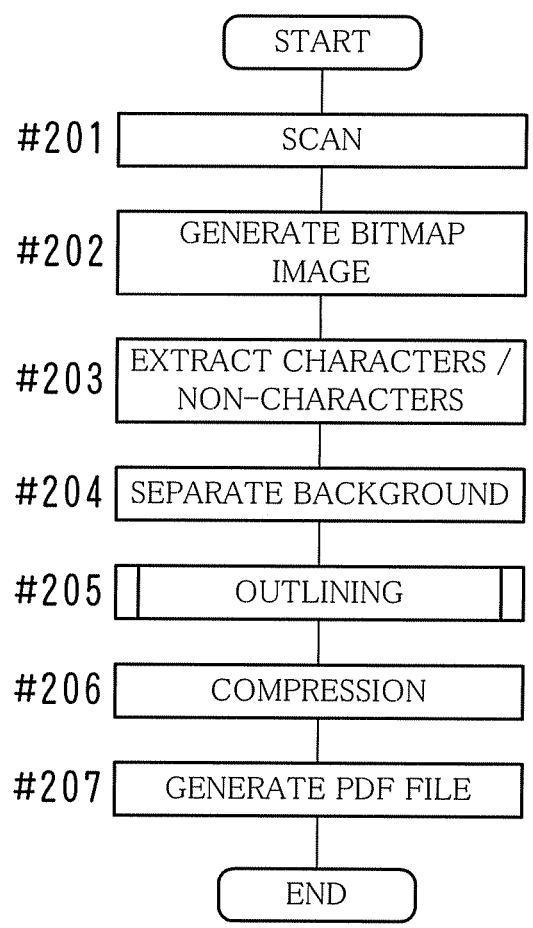

WHEN CHARACTER IS SMALLER THAN
PREDETERMINED SIZE

WHEN CHARACTER IS GREATER THAN OR
EQUAL TO PREDETERMINED SIZE

FIG. 16A

ABCDE

FIG. 16B

ABCDE

FIG. 17A

ABCDE

FIG. 17B

ABCDE

IMAGE PROCESSING APPARATUS, IMAGE CONVERSION METHOD, AND RECORDING MEDIUM

This application is based on Japanese patent application No. 2008-145922 filed on Jun. 3, 2008, the contents of which are hereby incorporated by reference.

BACKGROUND OF THE INVENTION

1. Field of the Invention

The present invention relates to an image processing apparatus and conversion method thereof for converting image data that has been scanned by a scanner into a vector format.

2. Description of the Related Art

It has recently become common to scan paper documents using a scanner and store the scanned documents in digitized form. A document scanned by a scanner is stored, for example, as image data in bitmap format.

The bitmap format expresses characters as a group of dots (pixels), and thus it is not necessary to perform complex calculations when displaying or printing those characters. However, the bitmap format has a disadvantage in that "jaggies" (stair-like artifacts) may be noticeably visible in the contours of the characters displayed or printed depending on the resolution of the apparatus that outputs (displays or prints) the characters (the output apparatus).

A process called "outlining" has therefore been conventionally performed so as to convert bitmap images into vector font images (vector images).

In a vector image, a character is reproduced by forming contour lines by approximating the contours of the character to straight lines and curved lines and then filling in the regions surrounded by those contour lines, a process that makes jaggies less apparent. Furthermore, because the outputted product does not depend on the resolution of the output apparatus, the image quality of character portions can be stabilized easily even if the output apparatus changes. However, it is necessary to increase the number of points used to reproduce the contours of a character (contour points) in order to express the character as accurately and smoothly as possible in a vector image. As a result, maintaining the image quality of character portions significantly increases the amount of data.

An image processing apparatus has been proposed as conventional technology regarding vector images (JP 2007-129557A).

According to the image processing apparatus, image data obtained by scanning a document is divided according to attributes such as character size, font, color, and so on, and outlining is performed according to each piece of data into which the image data was divided.

However, as described above, there are situations where converting the image to a vector image increases the overall amount of image data. The number of contour points increases particularly with characters that have complex shapes, and thus the increase in the data amount is especially prominent in cases where such characters are numerous. Although reducing the number of contour points can be considered here, doing so risks altering the shape of the character, and thus such a method is not favorable.

SUMMARY

Having been conceived in light of such problems, it is an object of the present invention to enable the generation of vector images that positively maintain the shape of characters while also having a lower data amount than the conventional art.

According to one aspect of the present invention, an image processing apparatus includes a character extraction portion extracting a character from raster image data, a size detection portion detecting a size of the character, a determination portion determining, based on the size of the character, whether or not curve approximation is to be used when the character is converted from a raster format to a vector format, and an image conversion portion converting, when the determination portion determines that the curve approximation is to be used, the character from the raster format to the vector format by performing straight-line approximation or the curve approximation on each part of a contour of the character, and converting, when the determination portion determines that the curve approximation is not to be used, the character from the raster format to the vector format by performing the straight-line approximation on each part of the contour of the character without performing the curve approximation thereon.

Preferably, the determination portion may determine that the curve approximation is not to be used when the size of the character is smaller than a predetermined size.

Further, the determination portion may determine that the curve approximation is not to be used when the size of the character is smaller than 6 points.

Moreover, the determination portion may determine that the curve approximation is to be used when the size of the character is larger than 10.5 points.

BRIEF DESCRIPTION OF THE DRAWINGS

FIGS. 12A and 12B are diagrams illustrating an example of block data that has undergone approximation processing.

FIG. 13 is a flowchart illustrating the flow of processing performed by an image forming apparatus when converting scanned image data into a PDF file.

FIGS. 16A and 16B are diagrams illustrating an example of results obtained when an approximation process according to an embodiment of the present invention is carried out on a large-sized character.

FIGS. 17A and 17B are diagrams illustrating an example of results obtained when an approximation process according to an embodiment of the present invention is carried out on a small-sized character.

DESCRIPTION OF THE PREFERRED EMBODIMENTS

Figure 1:
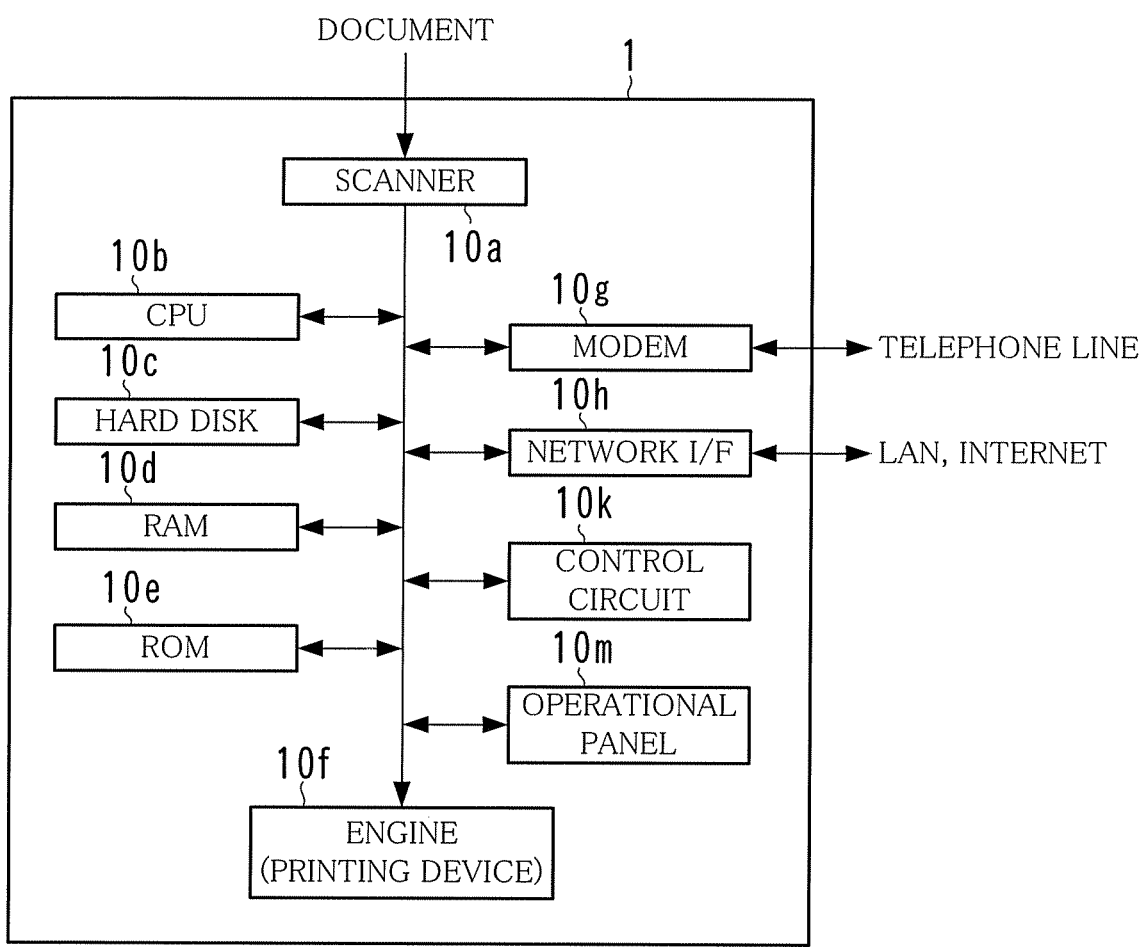
FIG. 1 is a diagram illustrating an example of the hardware configuration of an image forming apparatus according to an embodiment of the present invention.

FIG. 1 is a diagram illustrating an example of the hardware configuration of an image forming apparatus 1 according to an embodiment of the present invention.

The image forming apparatus 1, shown in FIG. 1, is an image processing apparatus that integrates a variety of functions, such as copying, scanning, faxing, network printing, document server functionality, file transfer functionality, and so on. Such devices are also sometimes called MFPs, or Multi-Function Peripherals.

As shown in FIG. 1, the image forming apparatus 1 is configured of a scanner 10a, a CPU 10b, a hard disk 10c, a RAM 10d, a ROM 10e, a printing device 10f, a modem 10g, a network interface 10h, a control circuit 10k, an operational panel 10m, and so on.

The scanner 10a is a device that optically scans images such as photographs, characters, drawings, charts, and so on that are printed on a paper document (called simply a "document" hereinafter) and creates digital data thereof. The scanned image is stored as image data in a format, such as the bitmap format, expressed as RGB (red (R), green (G), and blue (B)). It is also possible to store the image data in the PDF format (Portable Document Format) by specifying that format in advance.

The CPU 10b performs processing for converting the image data of the document scanned by the scanner 10a into a file in a format such as TIFF, JPEG, bitmap, PDF, or the like. The CPU 10b also performs processing for converting image data in the bitmap format (a raster format) into a vector format. The CPU 10b performs overall control of the image forming apparatus 1, such as detecting input from a user, controlling displays made in the operational panel 10m, the creation of emails, and so on.

The printing device 10f is a device for printing, onto paper, an image representing the image data scanned by the scanner 10a or an image representing image data sent from another device. In the case where the image forming apparatus 1 is capable of color printing, the printing is performed using four colors of toner, or yellow, magenta, cyan, and black.

The operational panel 10m is a device through which the user makes various inputs with respect to the image forming apparatus 1. Using the operational panel 10m, the user can make various inputs, such as selecting the format in which to store image data, setting scanning conditions, inputting commands to start or execute processes, inputting email addresses, and so on.

The modem 10g is provided with a NCU (Network Control Unit), and connects to another fax terminal via an analog public line, performing data control based on a facsimile protocol, modulation/demodulation of fax data, and so on.

The network interface 10h is a NIC (Network Interface Card), and is an interface for connecting to another device via a LAN, the Internet, or the like.

The control circuit 10k is a circuit for controlling devices such as the hard disk 10c, the operational panel 10m, the scanner 10a, the printing device 10f, the modem 10g, the network interface 10h, and so on. The control circuit 10k is configured, for example, of a hardware circuit that uses various types of electrical components.

Figure 2:
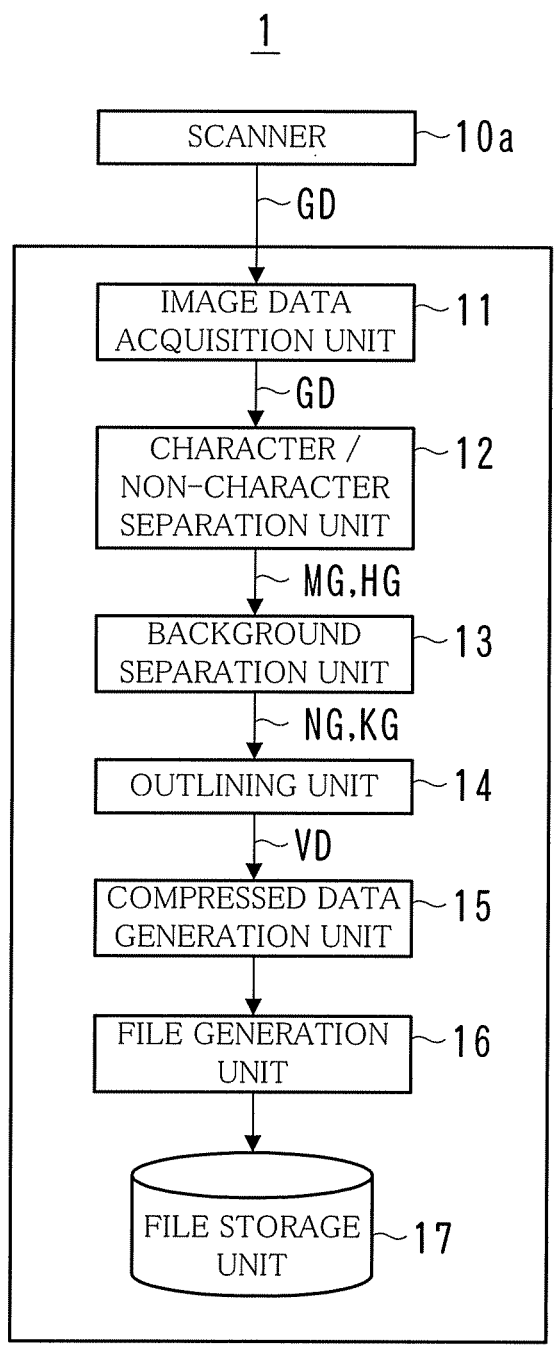
FIG. 2 is a diagram illustrating an example of the functional configuration of an image forming apparatus.

Programs, data, and so on for implementing the functions of the various units described later using FIG. 2 are stored in the hard disk 10c. These are read out as necessary from the RAM 10d, and the programs are executed by the CPU 10b. Part or all of these programs or data may be stored in the ROM 10e. Alternatively, some or all of the functions shown in FIG. 2 may be implemented by the control circuit 10k.

Figure 3:
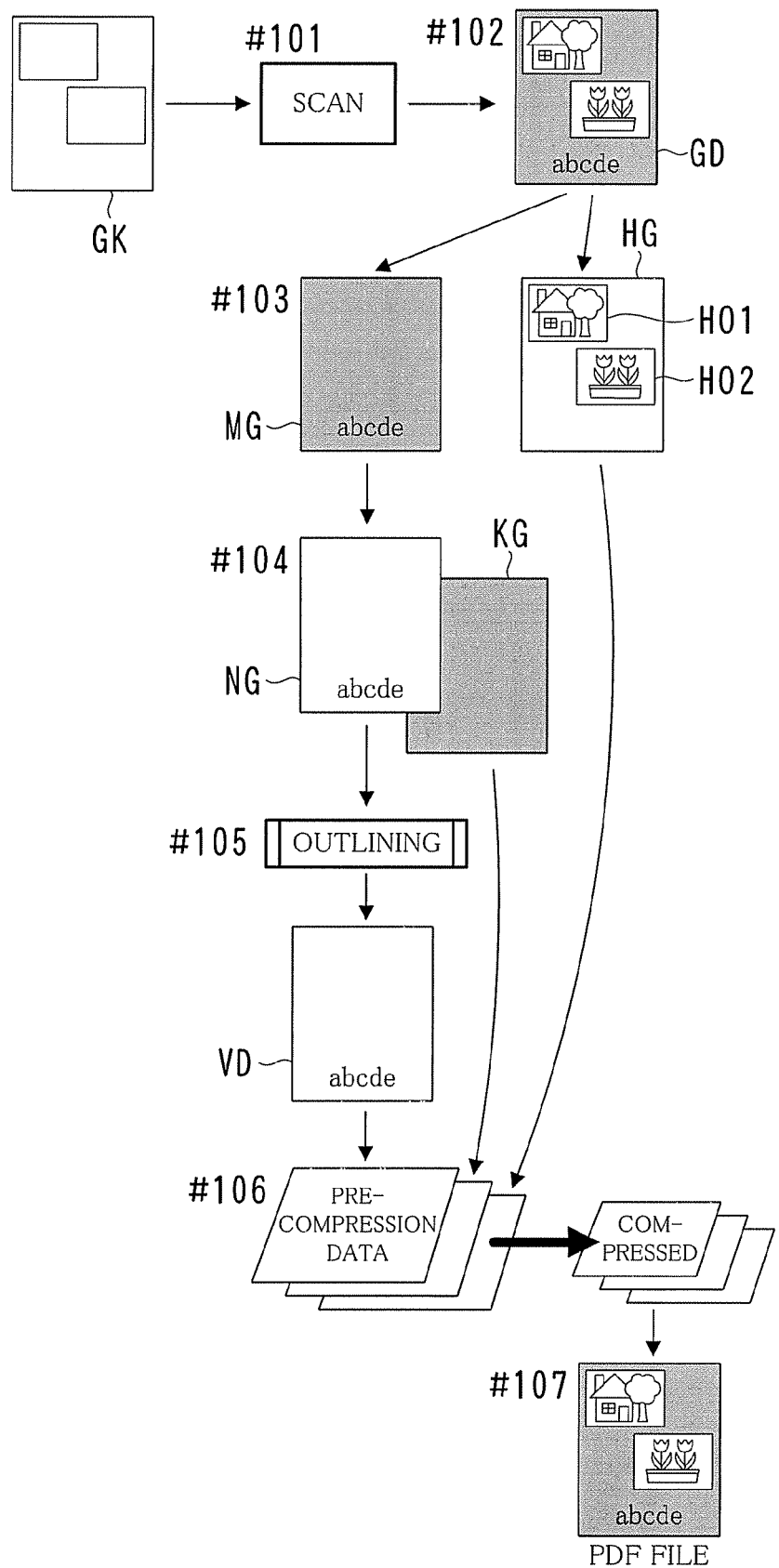
FIG. 3 is a diagram illustrating the flow of image processing performed by an image forming apparatus.

FIG. 2 is a diagram illustrating an example of the functional configuration of the image forming apparatus 1, and FIG. 3 is a diagram illustrating the flow of image processing performed by the image forming apparatus 1.

Next, processes performed by the various elements of the image forming apparatus 1 for converting, into a file in the PDF format, raster format document image data GD obtained by using the scanner 10a to scan a document GK in which images including characters and photographs have been printed, and storing the resulting PDF data, shall be described with reference to FIGS. 2 and 3.

As shown in FIG. 2, the image forming apparatus 1 is configured of an image data acquisition unit 11, a character/non-character separation unit 12, a background separation unit 13, an outlining unit 14, a compressed data generation unit 15, a file generation unit 16, a file storage unit 17, and so on.

When the user sets the document GK in the scanner 10a, sets the storage format to PDF, and inputs a command to execute the scan, the scanner 10a scans the image of the document GK, and generates raster format document image data GD (#101 in FIG. 3).

The image data acquisition unit 11 then acquires the document image data GD (#102). The character/non-character separation unit 12 performs a process for separating characters expressed in the document image data GD from non-character objects HO, which are objects aside from characters, such as diagrams, photographs, charts, and so on (#103). This process is carried out using a known method.

Hereinafter, the image data in which the non-character objects HO have been removed from the document image data GD, leaving the characters behind, shall be referred to as "first character image data MG". Meanwhile, the image data in which the characters have been removed from the document image data GD, leaving the non-character objects HO behind, shall be referred to as "non-character image data HG".

Next, the background separation unit 13 performs a process for separating the characters present in the first character image data MG from the background thereof (#104). This process is performed, for example, by extracting pixels whose darkness value is greater than or equal to a predetermined darkness value as pixels that form characters. Alternatively, the pixels that form edges may be extracted as pixels that form characters.

Hereinafter, the image data in which the background has been removed from the first character image data MG, leaving the characters behind, shall be referred to as "second character image data NG". Meanwhile, the image data in which the characters have been removed, leaving the background behind, shall be referred to as "background image data KG".

The outlining unit 14 performs an outlining process on the characters present in the second character image data NG, and performs a process for converting the characters expressed in the raster format to characters expressed in a vector format (#105). These processes shall be described in detail later. Hereinafter, the image data obtained by performing the outlining process on the second character image data NG shall be referred to as "vector character image data VD".

The compressed data generation unit 15 generates compressed data for each of the vector character image data VD, the background image data KG, and the non-character image data HG (#106).

To be more specific, the vector character image data VD is compressed using a lossless compression technique such as the Flate system. The background image data KG and the non-character image data HG are first reduced in resolution and are then compressed using a lossy compression technique such as the JPEG system.

The file generation unit 16 generates a file in the PDF format (a PDF file) using the generated compressed data of the vector character image data VD, the background image data KG, and the non-character image data HG, respectively. The file storage unit 17 stores the generated PDF file (#107).

Figure 4:
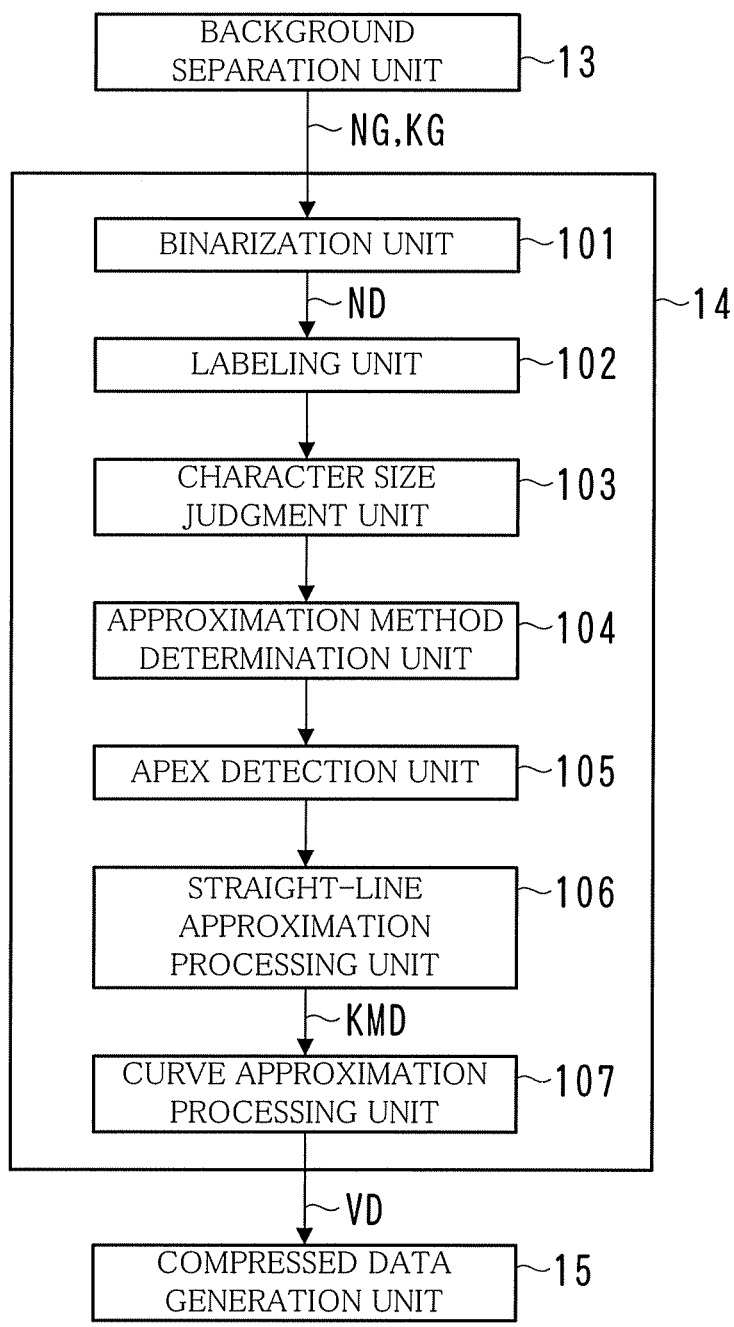
FIG. 4 is a diagram illustrating an example of a configuration of an outlining unit.
Figures 5A, 5B:
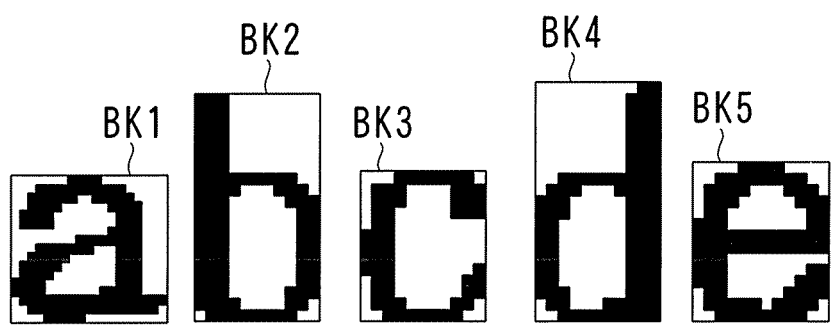
FIGS. 5A and 5B are diagrams illustrating an example of characters expressed by binarized image data.
Figure 6:
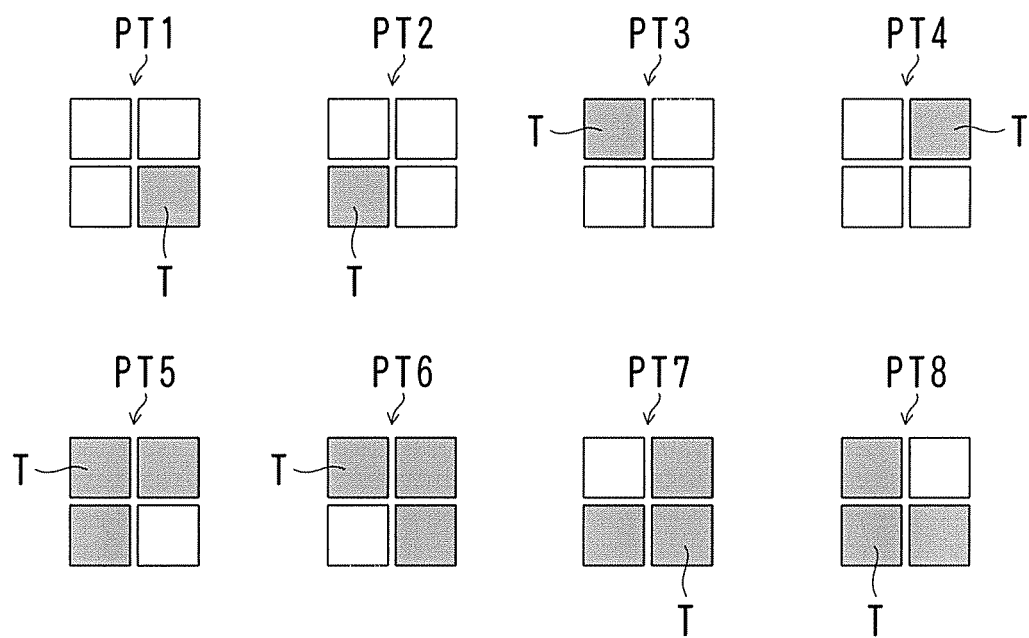
FIG. 6 is a diagram illustrating a pixel arrangement pattern for detecting apex pixels forming contours of a character.
Figure 7A:
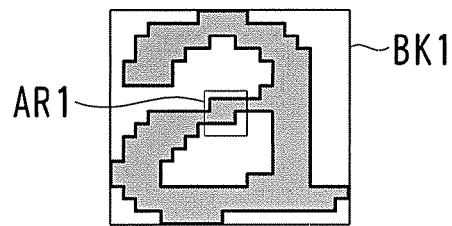
FIGS. 7A, 7B, and 7C are diagrams illustrating a specific example of apex pixel detection.
Figure 7B:
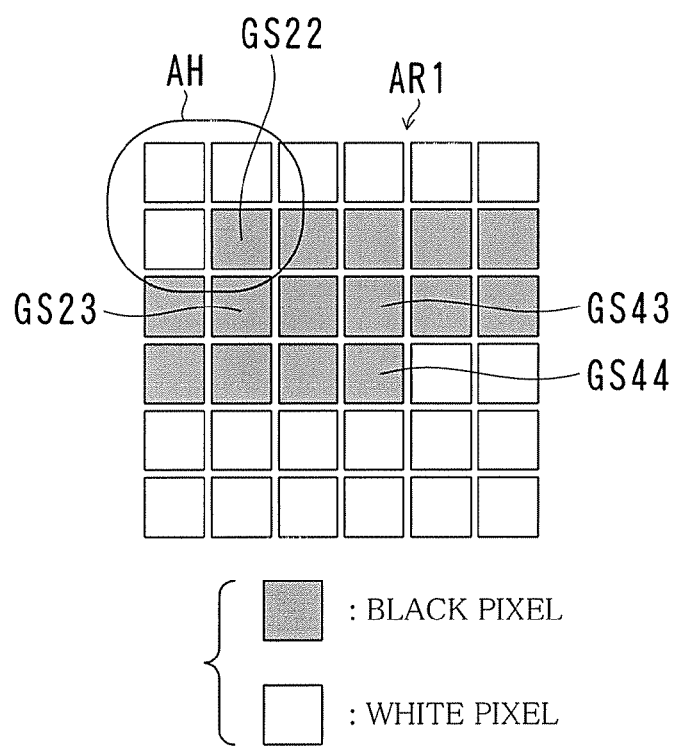
Figure 7C:
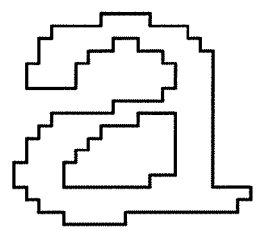
Figure 8A:
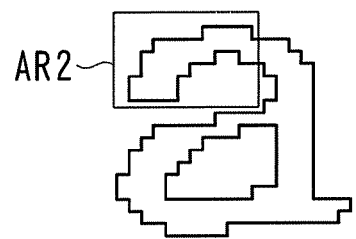
FIGS. 8A, 8B, and 8C are diagrams illustrating a specific example of straight-line approximation.
Figure 8B:
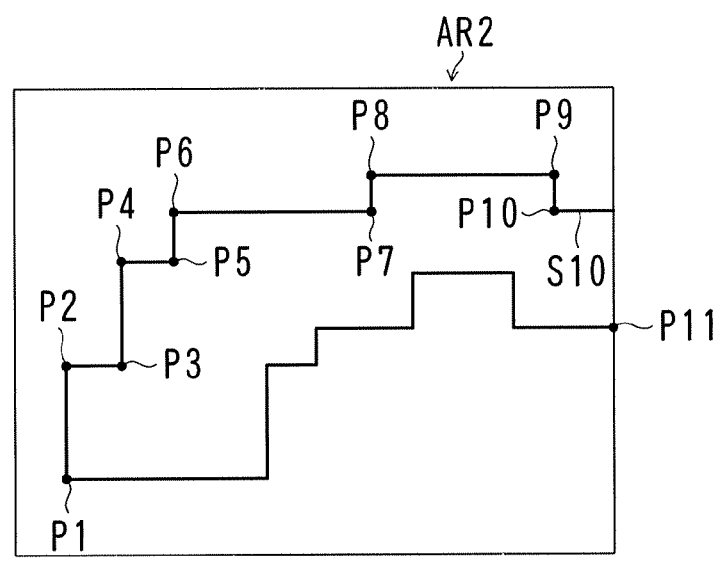
Figure 8C:
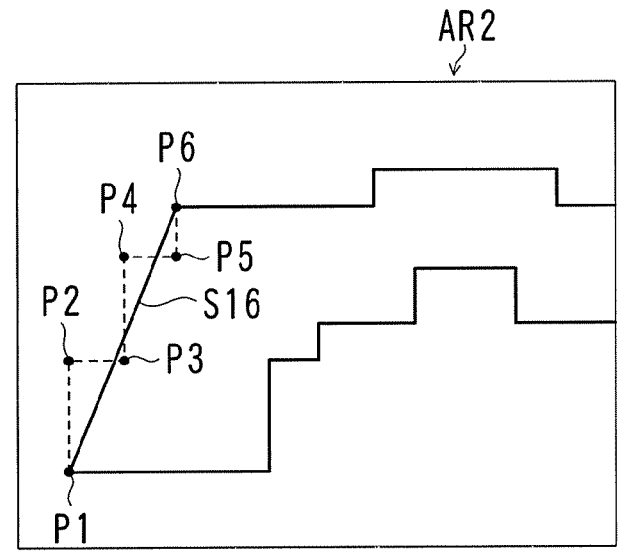
Figure 9A:
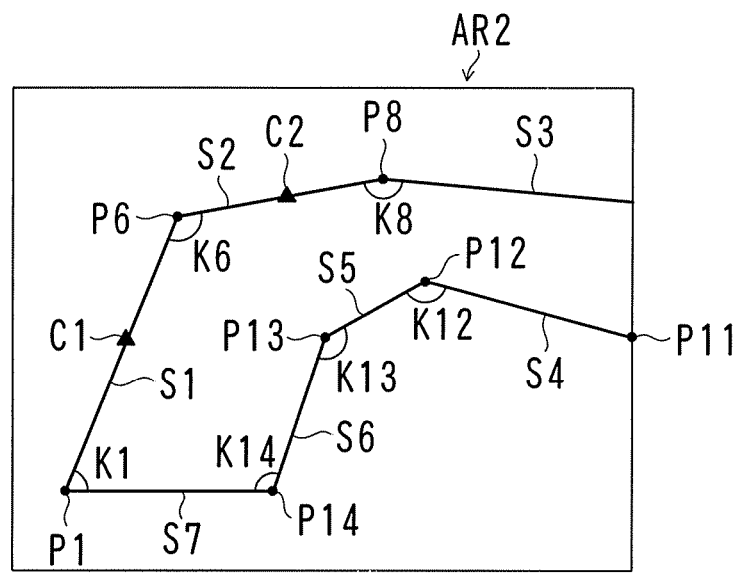
FIGS. 9A and 9B are diagrams illustrating a specific example of a selective curve approximation process.
Figure 9B:
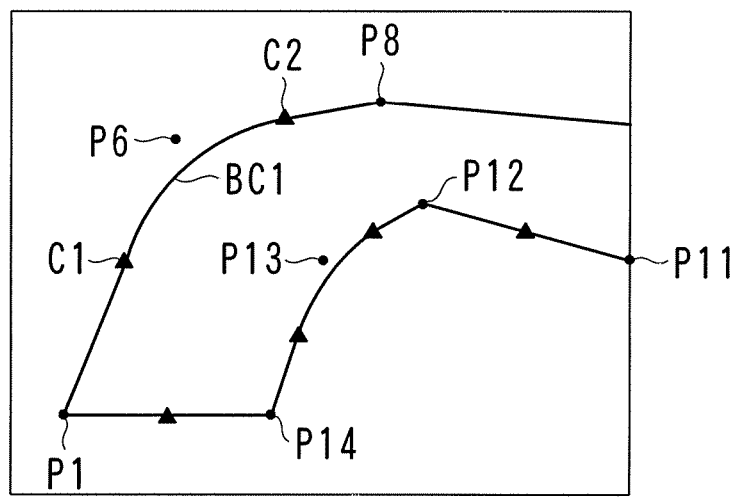
Figure 10:
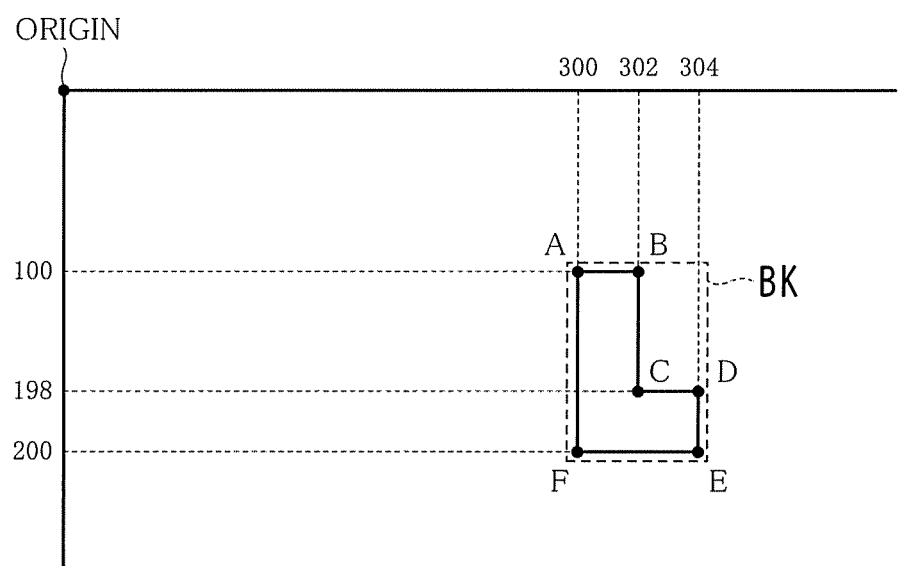
FIG. 10 is a diagram illustrating an example of binary character image data expressing the character "L".
Figure 11A:
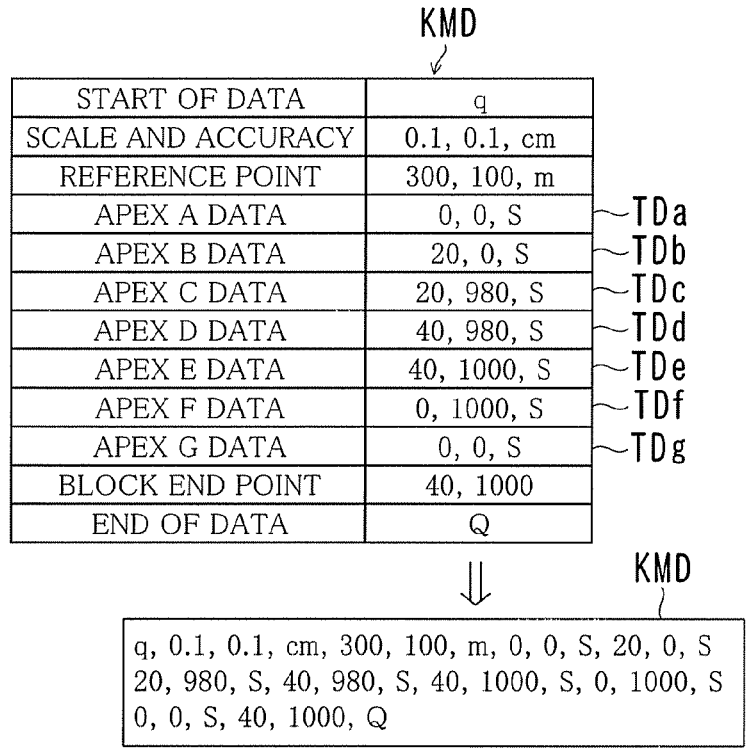
FIGS. 11A, 11B, and 11C are diagrams illustrating an example of the structure of block data that has undergone approximation processing.
Figure 11B:
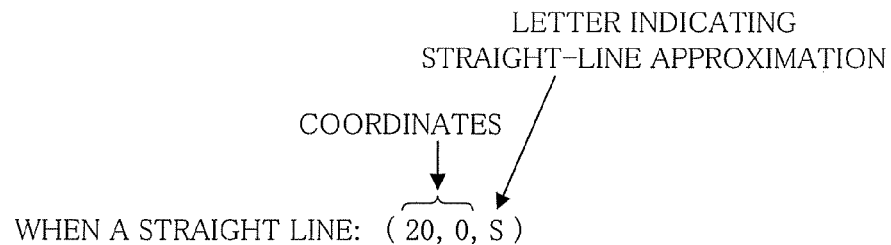
Figure 11C:
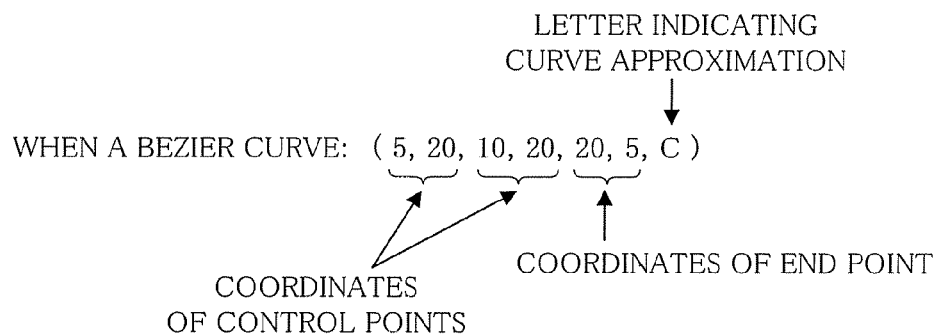

FIG. 4 is a diagram illustrating an example of the configuration of the outlining unit 14; FIGS. 5A and 5B are diagrams illustrating an example of characters expressed by binarized image data; FIG. 6 is a diagram illustrating a pixel arrangement pattern TP for detecting apex pixels forming contours of a character; FIGS. 7A, 7B, and 7C are diagrams illustrating a specific example of apex pixel detection; FIGS. 8A, 8B, and 8C are diagrams illustrating a specific example of straight-line approximation; FIGS. 9A and 9B are diagrams illustrating a specific example of a selective curve approximation process; FIG. 10 is a diagram illustrating an example of binary character image data ND expressing the character "L"; FIGS. 11A, 11B, and 11C are diagrams illustrating an example of the structure of approximation-processed block data KMD; and FIGS. 12A and 12B are diagrams illustrating an example of approximation-processed block data KMD.

The outlining unit 14 is configured of a binarizing unit 101, a labeling unit 102, a character size judgment unit 103, an approximation method determination unit 104, an apex detection unit 105, a straight-line approximation processing unit 106, a curve approximation processing unit 107, and so on.

The binarizing unit 101 binarizes the second character image data NG. In the binarization process, pixels with a darkness value greater than a binarization threshold become dotted pixels (that is, black pixels), whereas pixels with a darkness value less than the binarization threshold become non-dotted pixels (that is, white pixels). Through this, the character portions of the second character image data NG are expressed by black pixels, as shown in FIG. 5A. Hereinafter, the image data obtained by binarizing the second character image data NG shall be called "binarized character image data ND".

The labeling unit 102 performs labeling on each character expressed by the binarized character image data ND. This process is carried out as follows.

Black pixel groups included in the binarized character image data ND, made up of black pixels connected to one another, are detected, and blocks BK (blocks BK1, BK2, and so on), which are quadrangular regions that encapsulate the black pixel groups, are defined. In other words, the position of the pixel in the top-left of the binarized character image data ND is taken as the origin, and the coordinates of the pixels at the top-left and bottom-right of the block BK are found. The position of the character in that block BK is identified based on the coordinates of the top-left pixel that have been thus found. Based on the coordinates of the top-left and bottom-right pixels, the vertical and horizontal lengths of the block BK, or in other words, the size of the block BK, is found. The size of the block BK is used as the size of the character included in that block BK.

The character size judgment unit 103 judges whether or not the size of the character is smaller than a predetermined size, for each character that has undergone labeling.

The approximation method determination unit 104 determines the approximation method to be used on the contours of the characters based on the result of that judgment. In the present embodiment, the approximation method determination unit 104 determines that straight-line approximation is to be used for the contours of the character rather than curve approximation in the case where the size of the character has been judged as being smaller than the predetermined size. However, the approximation method determination unit 104 determines that curve approximation is to be used in addition to the straight-line approximation for the contours of the character in the case where the size of the character has been judged as being larger than the predetermined size.

The predetermined size is, for example, 30 pixels in height and 20 pixels in width. In this case, when the vertical length of the block BK is less than 30 pixels and the horizontal length of the block BK is less than 20 pixels, the approximation method determination unit 104 determines that straight-line approximation is to be used on the contours of the character rather than curve approximation. However, when the vertical length of the block BK is greater than or equal to 30 pixels and the horizontal length of the block BK is greater than or equal to 20 pixels, the approximation method determination unit 104 determines that curve approximation is to be used in addition to the straight-line approximation for the contours of the character.

The apex detection unit 105 detects pixels in the apexes of the characters (apex pixels) within the blocks BK. This detection process is performed using apex detection patterns PT1 to PT8, which are patterns of the arrangement of white and black pixels (arrangement patterns) used for detecting apex pixels. These patterns are illustrated in FIG. 6. In other words, the interior of the block BK is searched for a portion that matches one of the apex detection patterns PT1 to PT8 using pattern matching, and from the pixels in the matching portion, the pixel positioned at an apex position T in the matching apex detection pattern PT is detected as the apex pixel. Hereinafter, the apex detection patterns PT1, PT2, and so on shall sometimes be collectively referred to as "apex detection pattern PT". Other devices, members, and so on may also be collectively referred to in a similar manner, with the letters appended to their reference numerals being omitted. Next, the process for detecting an apex pixel shall be described in further detail with reference to FIGS. 7A, 7B, and 7C.

FIG. 7A indicates the block BK1 encapsulating the character "a" included in the binarized character image data ND. FIG. 7B illustrates an enlarged diagram of a specific portion within the block BK (a specific portion AR1).

Regarding this specific portion AR1, when the interior of the specific portion AR1 is scanned sequentially starting with the top-left pixel, an arrangement pattern that matches the apex detection pattern PT1 is detected in the part with a pixel group AH. In the pixel group AH, a pixel GS22, located in the apex position T of the apex detection pattern PT1, is detected as an apex pixel. Carrying out this apex pixel detection results in the detection of pixels GS23, GS43, and GS44 as apex pixels as well.

By connecting the detected apex pixels with a line segment, an image indicating the contours of the character "a", illustrated in FIG. 7C, can be generated.

The straight-line approximation processing unit 106 performs straight-line approximation on the contours of each character included in the binarized character image data ND. In the present embodiment, straight-line approximation is performed by approximating a character contour formed by three or more apexes to a line segment connecting two apexes (an approximation segment). This straight-line approximation is performed across the entire contour of the character. The procedure for straight-line approximation shall now be described in detail with reference to FIGS. 8A, 8B, and 8C.

FIG. 8A illustrates an image representing the contour of the character "a". This image is rendered by connecting the centers of the apex pixels found by the apex detection unit 105 to one another using line segments. FIG. 8B illustrates an enlarged diagram of a specific portion within the image representing the contour in FIG. 8A (a specific portion AR2).

First, an arbitrary apex is selected as a starting point in the specific portion AR2. Here, it is assumed that an apex P1 has been selected as the starting point. The starting point P1, and an apex P3 two spaces away from the starting point P1 serving as a candidate for the end point of an approximation segment (an end point candidate), are then selected. The distance between the segment connecting the starting point P1 and the end point candidate P3 and an apex P2 that is an apex between the starting point P1 and the end point candidate P3 is then found. It is then checked whether or not the distance that has been found is less than a predetermined threshold (a straight-line approximation threshold). In the case where the distance is less, the end point candidate shifts to the next apex, or apex P4, and the same process is carried out again. In other words, the distances between the line segment connecting the starting point P1 with the end point candidate P4 and the apexes between the starting point P1 and the end point candidate P4, or the apexes P2 and P3, are found. It is then checked whether or not the distances that have been found are less than a predetermined threshold (the straight-line approximation threshold). In the case where both distances are less than the straight-line approximation threshold, the end point candidate shifts to the next apex, or apex P5, and the same process is carried out yet again.

The end point candidate is sequentially shifted to the next apex until an end point candidate for which any of the distances between the line segment connecting the starting point with the end point candidate and the apexes between the starting point and the end point candidate apex are greater than the straight-line approximation threshold appears. The end point of the approximation segment is determined upon one of those distances being greater than the straight-line approximation threshold. The example of FIG. 8B assumes that when an apex P7 is taken as the end point candidate, the distance between the line segment connecting the starting point P1 with the end point candidate P7 and an apex P6 is greater than the straight-line approximation threshold.

When the end point candidate has been shifted to the apex P7, the distances between a line segment connecting the starting point P1 with the end point candidate P7 and each apex between the starting point P1 and the end point candidate P7 are found in the same manner. The distance between that line segment and the apex P6 is greater than the straight-line approximation threshold, and therefore the end point of the approximation segment whose starting point is the apex P1 is determined at this time. The end point is determined to be the apex one previous to the current end point candidate. In the example shown in FIG. 8B, the apex P6, which is one previous to the end point candidate P7, is determined to be the end point. Then, the apexes P1 and P6 are recorded as the starting point and the end point, respectively, so that the contour formed by the apexes P1, P2, P3, P4, P5, and P6 approximates a line segment S16 connecting the starting point P1 with the end point P6, as shown in FIG. 8C.

When the end point has been determined, that end point is then used as the starting point of the next approximation segment, and a process for finding that next approximation segment is then performed. In other words, the apex P6 is taken as the starting point, and an apex two spaces away therefrom, or an apex P8, is taken as an end point candidate; the distances between a line segment that connects the starting point P6 with the end point candidate P8 and the apexes between the starting point P6 and the end point candidate P8 are then found. The end point candidate is shifted and the end point is determined using the same method as has already been described. This process is repeated, and the starting points and end points of the approximation segments are found for all contours of the character.

Using the above method, the straight-line approximation processing unit 106 performs straight-line approximation on the contours of the characters in all the blocks BK detected through labeling, and outputs approximation-processed block data KMD representing the characters that have undergone the straight-line approximation for each block BK. Details of this approximation-processed block data KMD shall be given later.

The curve approximation processing unit 107 performs a curve approximation process (selective curve approximation process) on portions of the contours of the characters in the blocks BK whose character contours have been determined to be approximated using curve approximation, the process being performed on portions that fulfill a predetermined condition. The curve approximation is performed on the contours of the post-straight-line approximation characters represented by the approximation-processed block data KMD.

In the present embodiment, when two adjacent approximation segments, from among all the approximation segments that form character contours, fulfill the following conditions (1) and (2), the contour expressed by those two approximation segments is approximated by a Bezier curve.

(1) Both of the two approximation segments are shorter than a predetermined length (a curve approximation threshold).

(2) The lesser angle formed at the intersection of the two approximation segments (a judgment target angle) is greater than a predetermined angle (an approximation threshold angle).

Detailed descriptions of the selective curve approximation process shall now be given with reference to FIGS. 9A and 9B.

FIG. 9A illustrates a contour of the character "a" within a specific portion AR2, formed by approximation segments S1 to S7. In the example shown in FIG. 9A, judgment target angles K6, K8, K12, and K13 are assumed to be greater than the approximation threshold angle, whereas judgment target angles K1 and K14 are assumed to be smaller than the approximation threshold angle. Furthermore, the lengths of approximation segments S1, S2, S5, S6, and S7 are assumed to be shorter than the curve approximation threshold, whereas approximation segments S3 and S4 are assumed to be longer than the curve approximation threshold.

In FIG. 9A, the approximation segments S1 and S2 are both shorter than the curve approximation threshold, and thus fulfill the above condition (1). Furthermore, the judgment target angle K6 is greater than the approximation threshold angle and thus fulfills the above condition (2). In other words, the approximation segments S1 and S2 fulfill both the above conditions (1) and (2), and thus curve approximation is performed on the contour of these approximation segments. The curve approximation is performed, for example, as follows.

First, midpoints C1 and C2 are found for the approximation segments S1 and S2, respectively. The midpoints C1 and C2 are then taken as a starting point and an ending point, respectively, and two other control points are then determined in accordance with a predetermined rule; a Bezier curve BC1 as shown in FIG. 9B is then found. The two control points are assumed to be points for drawing a Bezier curve that make contact with the approximation segment S1 at the midpoint C1 and the approximation segment S2 at the midpoint C2. For example, the midpoint between the apex P6 and the midpoint C1, and the midpoint between the apex P6 and the midpoint C2, may be taken as the control points. The control points may also be determined to be points based upon which the Bezier curve is as close as possible to the apex P6.

Next, the approximation segments S2 and S3 shall be discussed. Because the approximation segment S3 is longer than the curve approximation threshold, it does not fulfill the above condition (1). The curve approximation is therefore not performed on this pair of approximation segments.

Such a process is performed on each pair of adjacent approximation segments, and the curve approximation is performed on pairs thereof that fulfill the above conditions (1) and (2). When such a process is performed on the example shown in FIG. 9A, a contour such as that shown in FIG. 9B is obtained.

The curve approximation processing unit 107 uses such a method to perform the selective curve approximation process on the contours of the characters represented by all instances of the approximation-processed block data KMD obtained from the straight-line approximation processing unit 106, thereby converting the approximation-processed block data KMD into data representing post-selective curve approximation process characters. Vector character image data VD, which is image data in vector format representing those characters, is generated using the approximation-processed block data KMD of the characters that have undergone labeling. The vector character image data VD is then outputted to the compressed data generation unit 15. Details regarding the approximation-processed block data KMD shall be provided with reference to FIGS. 10 to 12.

FIG. 10 illustrates an image including the character "L". The contours of this character "L" are expressed by approximation segments connecting apexes A, B, C, D, E, and F to one another. When the top-left of the image is taken as the origin, the coordinates of the apexes A, B, C, D, E, and F are as denoted in FIG. 10.

As shown in FIG. 11A, the approximation-processed block data KMD of the block BK shown in FIG. 10 includes a letter (q) indicating the start of the approximation-processed block data KMD of that block BK, the scale and accuracy, the coordinates of a reference point, apex data TD for apexes A through G, a letter (Q) indicating the end of the approximation-processed block data KMD of that block BK, and the coordinates of the bottom-right point of that block BK (a block end point). The reference point is the top-left point of the block BK.

As shown in FIG. 11B, when an apex is the end point of a line segment resulting from straight-line approximation, the apex data TD indicates the coordinates of that apex relative to the reference point, which is used as the origin, and a letter "S" indicating straight-line approximation.

For example, apex data TDc for the apex C indicates "20, 980, S". "S" indicates straight-line approximation, meaning that the character contour is approximated by an approximation segment that connects the apex B, which is the apex immediately prior to the apex C, with the apex C. In other words, assuming the reference point is used as the origin, this means that the contour is drawn and reproduced by an approximation segment that connects the apex B, whose coordinates are (20, 0), with the apex C, whose coordinates are (20, 980).

Meanwhile, in the case of curve approximation, the apex data TD indicates the coordinates of two control points, the coordinates of the end point, and the letter "C" indicating curve approximation, as shown in FIG. 11C. This means that, in the example shown in FIG. 11B, assuming the reference point is used as the origin, the character contours are approximated by finding a Bezier curve in which points whose coordinates are (5, 20) and (10, 20) are used as the control points, the point whose coordinates are (20, 5) is used as the end point, and the point immediately prior to the apex of this apex data TD (the end point of the approximation segment immediately previous, when the previous approximation method is straight-line approximation, or the end point of the Bezier curve immediately previous, when the previous approximation method is curve approximation) is used as the starting point.

FIG. 12A illustrates the approximation-processed block data KMD of a block BK generated by performing straight-line approximation. When selective curve approximation process is further performed on the character contours reproduced by this approximation-processed block data KMD, the approximation-processed block data KMD is updated to that shown in FIG. 12B. The underlined portions of FIG. 12B are the apex data TD of the apexes of portions of contours expressed through curve approximation. As can be seen in the example of FIGS. 12A and 12B, performing curve approximation increases the amount of the apex data TD, and therefore the overall size of the approximation-processed block data KMD increases as well.

Figure 14:
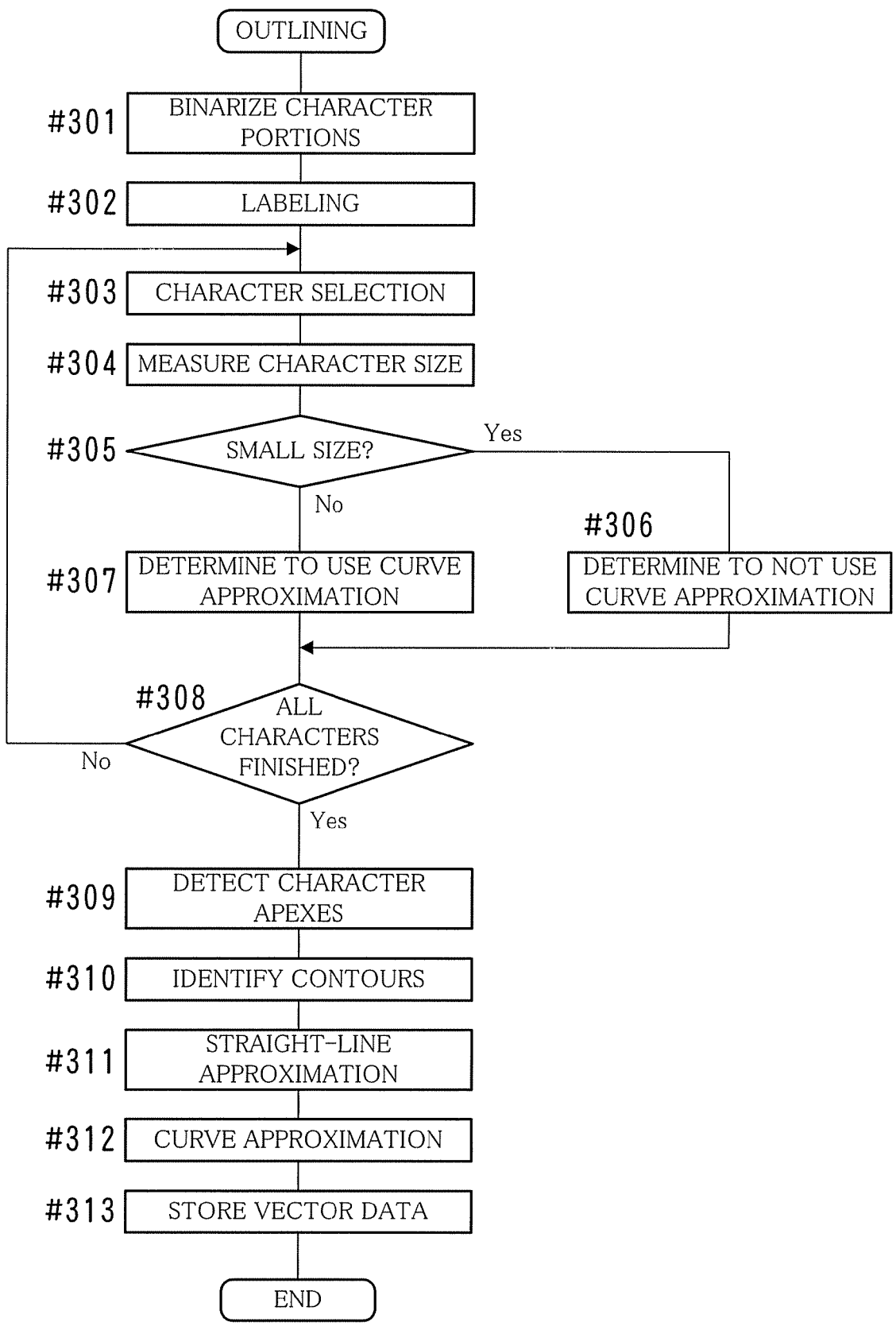
FIG. 14 is a flowchart illustrating the flow of an outlining process.
Figure 15A:
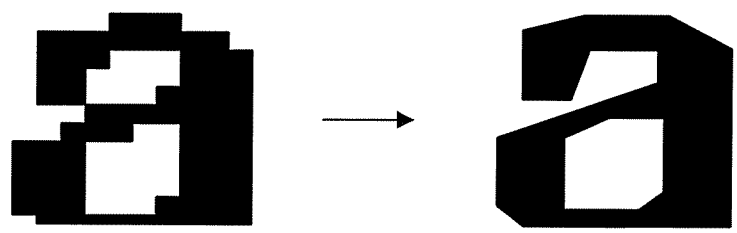
FIGS. 15A and 15B are diagrams illustrating an example of results obtained when an outlining process according to an embodiment of the present invention is carried out on a large-sized character and a small-sized character.
Figure 15B:
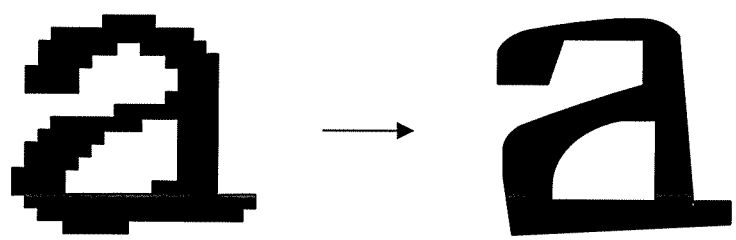

FIG. 13 is a flowchart illustrating the flow of processing performed by the image forming apparatus 1 when converting scanned image data into a PDF file; FIG. 14 is a flowchart illustrating the flow of an outlining process; and FIGS. 15A and 15B are diagrams illustrating an example of results obtained when the outlining process according to the present embodiment is carried out on a large-sized character and a small-sized character.

In FIG. 13, the user sets a document GK in the scanner 10a, and specifies the PDF file format as the storage format. When the user inputs a command to execute the scan, the image forming apparatus 1 scans the document GK (#201), thereby generating raster format document image data GD expressing an image of the document GK (#202). Using the generated raster format document image data GD, the image forming apparatus 1 generates a PDF file in the following manner.

First, portions with characters and portions with non-character objects HO are extracted from the document image data GD (#203). The background is then eliminated from the first character image data MG, which expresses the extracted characters with the non-character objects HO having been left out (#204). The outlining process according to the present embodiment is then performed on the second character image data NG, expressing the extracted characters with the background having been eliminated (#205).

In the outlining process, the second character image data NG is first binarized (#301 in FIG. 14). The labeling process is then performed on the binarized character image data ND obtained through the binarization, and the blocks BK encapsulating the characters included therein are obtained (#302). The approximation method to be used when converting the labeled characters into vector format is then determined. This determination is performed as follows.

First, a single labeled character is selected (#303). The size of that character (the selected character) is then found (#304). It is then checked whether or not that size is less than a predetermined size.

In the case where the size of the selected character is less than a predetermined size (Yes in #305), it is determined that the curve approximation process is not to be performed on that selected character (#306).

However, in the case where the size of the selected character is greater than the predetermined size (No in #305), it is determined that the curve approximation process is to be performed on that selected character (#307).

The processes of steps #303 to #307 are then performed on all characters that have been labeled (No in #308).

When the processes of steps #303 to #307 have been performed on all characters that have been labeled (Yes in #308), the apexes of each character are detected (#309), and the contours of the characters are identified (#310). The contours of the characters then undergo straight-line approximation (#311).

After the straight-line approximation, the selective curve approximation process, described earlier, is performed on the characters for which it has been determined that curve approximation is to be performed in #307 (#312).

In other words, characters whose size is less than a predetermined size undergo approximation on their contours using only straight-line approximation, without using curve approximation. Character contours are thus drawn with straight lines, as shown in FIG. 15A. However, characters whose size is not less than the predetermined size undergo approximation on their contours using straight-line approximation and curve approximation. Character contours are thus drawn with both straight lines and curves, as shown in FIG. 15B.

The binarized character image data ND is converted from raster format to vector format through the above process, and the resulting vector format vector character image data VD is then stored (#313).

The stored vector character image data VD is compressed using a lossless compression technique, whereas the background image data KG and non-character image data HG are compressed using a lossy compression technique after being converted to low resolution (#206 in FIG. 13). A PDF file is generated using the respective pieces of compressed data (#207).

Figures 16A, 16B:
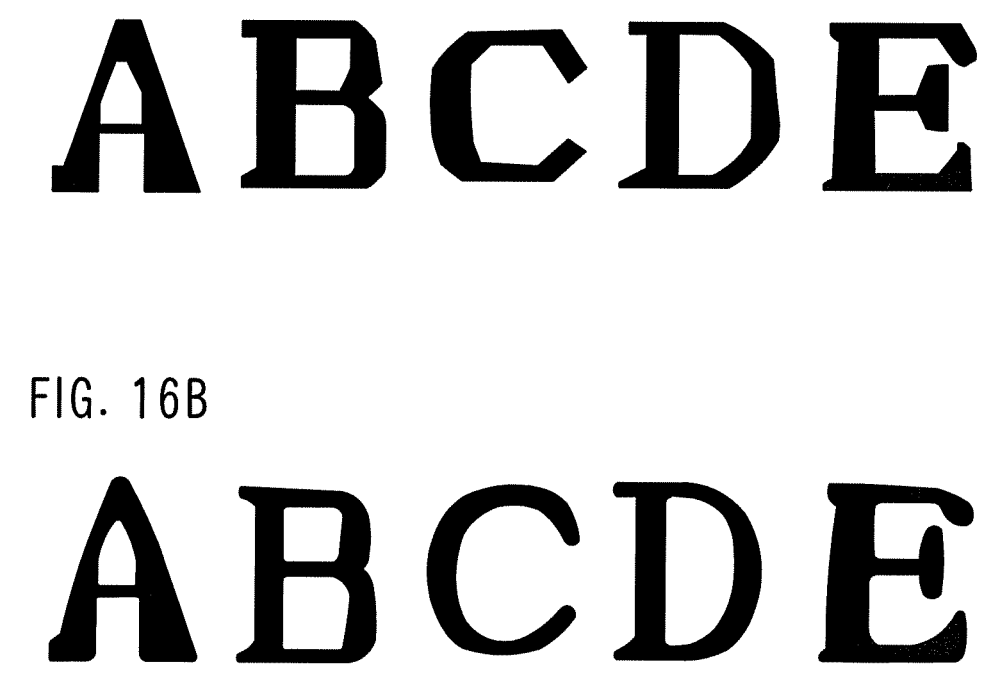
Figures 17A, 17B:
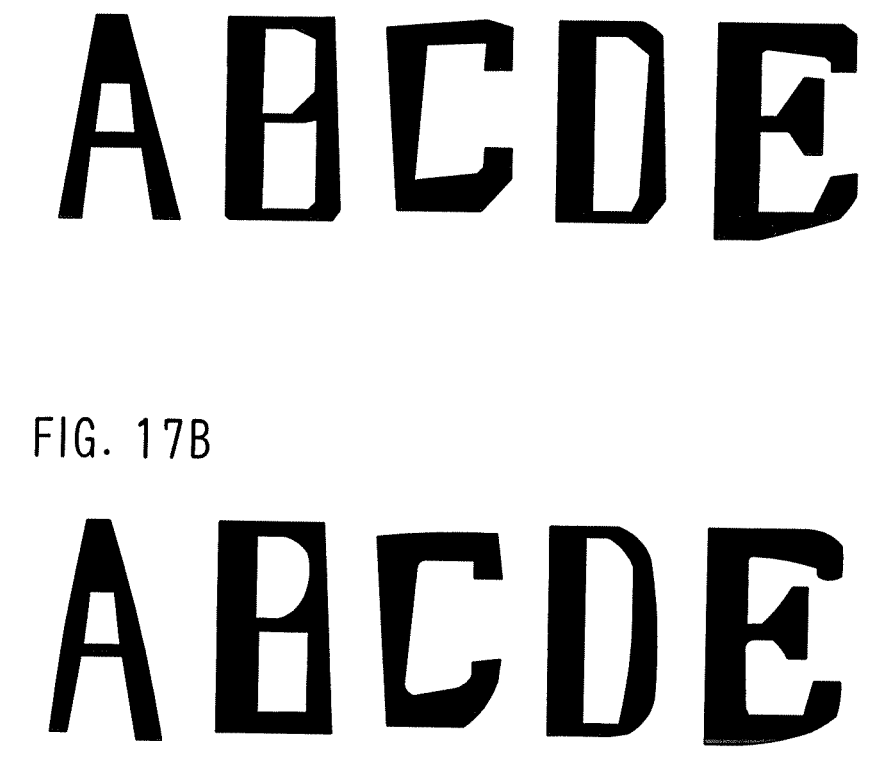

FIGS. 16A and 16B are diagrams illustrating an example of results obtained when the approximation process according to the present embodiment is carried out on a large-sized character, whereas FIGS. 17A and 17B are diagrams illustrating an example of results obtained when the approximation process according to the present embodiment is carried out on a small-sized character.

FIGS. 16A and 17A illustrate an example in which straight-line approximation has been performed on the characters "ABCDE". FIGS. 16B and 17B, meanwhile, illustrate an example of the result of performing the selective curve approximation process on the contours of the characters shown in FIGS. 16A and 17A that have undergone the straight-line approximation. Note that FIGS. 16A and 16B are examples using characters in a 10-point font, whereas FIGS. 17A and 17B are examples using characters in a 6-point font.

As seen in FIG. 16A, when approximation is performed on the character contours using only straight-line approximation, without using curve approximation, angles arise in curved portions of the character contours, leading to angular characters. The shape of such characters thus appears unnatural. Such unnaturalness is particularly marked in characters where the percentage of curves is high, such as the letter "C". Therefore, the selective curve approximation process is performed on the character contours that have undergone the straight-line approximation. Doing so makes it possible to obtain character contours such as those shown in FIG. 16B. As can be seen by comparing FIGS. 16A and 16B, it is possible to obtain natural contours by performing the selective curve approximation process.

However, as can be seen by comparing FIGS. 17A and 17B, when the size of the characters is small, there is no major difference in appearance regardless of whether or not curve approximation is used. Therefore, it can be said that it is desirable to use curve approximation particularly in the case where the size of the characters is large in order to reduce image quality degradation.

According to the present embodiment, curve approximation, the use of which results in a large amount of data after the approximation, is not used on small characters for which almost no difference is apparent between straight-line approximation and curve approximation. It is therefore possible to reduce the post-approximation data amount to a greater extent than with the conventional method that uses curve approximation unconditionally even on small characters. Furthermore, because curve approximation, which involves a large amount of processing, can be favorably reduced, the efficiency of the process can be improved. Finally, because curve approximation is performed on characters of a size at which angularity in the contours is apparent after using straight-line approximation, the abovementioned effects can be achieved while causing almost no degradation in image quality, as compared to the conventional method.

In short, according to the present embodiment, it is possible to generate vector images that positively maintain the shape of characters while also having a lower data amount than the conventional art.

Although the predetermined size is 20 pixels in length on the vertical and the horizontal in the present embodiment, other sizes may be employed instead. Moreover, although the unit of the predetermined size is expressed in pixels, other units may be used instead, such as "points", which is a unit that expresses the size of characters. When using points, the predetermined size may be set at, for example, 10 points, 6 points, or the like.

Although image data scanned by the scanner 10a is used in the present embodiment, image data received by the network interface 10h from another device may also be used.

Furthermore, although binarization is performed by the binarizing unit 101 based on the darkness value in the present embodiment, this process may instead be performed based on the brightness. In such a case, for example, pixels whose brightnesses are greater than a predetermined threshold are taken as white pixels, whereas pixels whose brightnesses are lower than the predetermined threshold are taken as black pixels.

Part of the functions of the various elements in FIG. 2 or 4 may be implemented as hardware. For example, the image forming apparatus 1 may be provided with hardware such as an input image processing unit, an output image processing unit, and so on. The input image processing unit accepts the document image data GD from the scanner 10a, and performs processes such as color conversion, color correction, resolution conversion, region determination, and so on. The processed data is then stored in the hard disk 10c, the RAM 10d, the ROM 10e, or the like.

Note that the methods of straight-line approximation and curve approximation are not intended to be limited to those discussed in the present embodiment, and various other methods may be used as well.

Finally, the configuration and functions of all or part of the image forming apparatus 1, the details or order of the processing performed thereby, the details of the various pieces of data, and so on can be modified in various ways within the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus comprising:
   a character extraction portion for extracting a character from raster image data;
   a binarization portion for binarizing the extracted character;
   an apex detection portion for detecting apexes which define the binarized character such that the binarized character can be completely formed with only straight lines having endpoints coinciding with the apexes;
   a size detection portion for detecting a size of the binarized character;
   a determination portion for determining, based on the size of the character, whether or not curve approximation is to be used when the character is converted from a raster format to a vector format;
   an image conversion portion for converting, when the determination portion determines that the curve approximation is to be used, the character from the raster format to the vector format by performing straight-line approximation or the curve approximation on each part of a contour of the character defined by the apexes detected by the apex detection portion, and for converting, when the determination portion determines that the curve approximation is not to be used, the character from the raster format to the vector format by performing the straight-line approximation on each part of the contour of the character defined by the apexes detected by the apex detection portion without performing the curve approximation thereon; and
   wherein the curve approximation is performed on the contour of the character when the straight-line approximation results in two approximation segments that are shorter than a predetermined length and when a lesser angle formed at an intersection of the two approximation segments is greater than a predetermined angle.

2. The image processing apparatus according to claim 1, wherein the determination portion determines that the curve approximation is not to be used when the size of the character is smaller than a predetermined size.

3. The image processing apparatus according to claim 1, wherein the determination portion determines that the curve approximation is not to be used when the size of the character is smaller than 6 points.

4. The image processing apparatus according to claim 1, wherein the determination portion determines that the curve approximation is to be used when the size of the character is larger than 10.5 points.

5. An image processing apparatus for compressing raster image data, the apparatus comprising:
   a character extraction portion for extracting a character from the raster image data;
   a binarization portion for binarizing the extracted character;
   an apex detection portion for detecting apexes which define the binarized character such that the binarized character can be completely formed with only straight lines having endpoints coinciding with the apexes;
   a size detection portion for detecting a size of the binarized character;
   a determination portion for determining, based on the size of the character, whether or not curve approximation is to be used when the character is converted from a raster format to a vector format;
   an image conversion portion for converting, when the determination portion determines that the curve approximation is to be used, the character from the raster format to the vector format by performing straight-line approximation or the curve approximation on each part of a contour of the character defined by the apexes detected by the apex detection portion, and for converting, when the determination portion determines that the curve approximation is not to be used, the character from the raster format to the vector format by performing the straight-line approximation on each part of the contour of the character defined by the apexes detected by the apex detection portion without performing the curve approximation thereon;
   a compression portion for performing lossless compression on the character thus converted to the vector format and for performing lossy compression on a part other than the character included in the raster image data, so that compressed data is generated; and
   wherein the curve approximation is performed on the contour of the character when the straight-line approximation results in two approximation segments that are shorter than a predetermined length and when a lesser angle formed at an intersection of the two approximation segments is greater than a predetermined angle.

6. An image conversion method for converting image data from a raster format to a vector format, the method comprising:
   extracting a character from the image data in the raster format;
   binarizing the extracted character;
   detecting apexes which define the binarized character such that the binarized character can be completely formed with only straight lines having endpoints coinciding with the apexes;
   detecting a size of the binarized character;
   determining, based on the size of the character, whether or not curve approximation is to be used when the character is converted from the raster format to the vector format;
   converting, when it is determined that the curve approximation is to be used, the character from the raster format to the vector format by performing straight-line approximation or the curve approximation on each part of a contour of the character defined by the detected apexes;
   converting, when it is determined that the curve approximation is not to be used, the character from the raster format to the vector format by performing the straight-line approximation on each part of the contour of the character defined by the detected apexes without performing the curve approximation thereon; and
   wherein the curve approximation is performed on the contour of the character when the straight-line approximation results in two approximation segments that are shorter than a predetermined length and when a lesser angle formed at an intersection of the two approximation segments is greater than a predetermined angle.

7. The image conversion method according to claim 6, wherein the determining includes determining that the curve approximation is not to be used when the size of the character is smaller than a predetermined size.

8. The image conversion method according to claim 6, wherein the determining includes determining that the curve approximation is not to be used when the size of the character is smaller than 6 points.

9. The image conversion method according to claim 6, wherein the determining includes determining that the curve approximation is to be used when the size of the character is larger than 10.5 points.

10. A recording medium storing thereon a computer program executed by a computer that converts image data from a raster format to a vector format, the computer program causing the computer to perform:

extracting a character from the image data in the raster format;
   binarizing the extracted character;
   detecting apexes which define the binarized character such that the binarized character can be completely formed with only straight lines having endpoints coinciding with the apexes;
   detecting a size of the binarized character;
   determining, based on the size of the character, whether or not curve approximation is to be used when the character is converted from the raster format to the vector format;
   converting, when it is determined that the curve approximation is to be used, the character from the raster format to the vector format by performing straight-line approximation or the curve approximation on each part of a contour of the character defined by the detected apexes;
   converting, when it is determined that the curve approximation is not to be used, the character from the raster format to the vector format by performing the straight-line approximation on each part of the contour of the character defined by the detected apexes without performing the curve approximation thereon; and
   wherein the curve approximation is performed on the contour of the character when the straight-line approximation results in two approximation segments that are shorter than a predetermined length and when a lesser angle formed at an intersection of the two approximation segments is greater than a predetermined angle.

11. The recording medium according to claim 10, wherein the determining includes determining that the curve approximation is not to be used when the size of the character is smaller than a predetermined size.

12. The recording medium according to claim 10, wherein the determining includes determining that the curve approximation is not to be used when the size of the character is smaller than 6 points.

13. The recording medium according to claim 10, wherein the determining includes determining that the curve approximation is to be used when the size of the character is larger than 10.5 points.

* * * * *